United States Patent Office 2,866,741
Patented Dec. 30, 1958

2,866,741

CONTROL ROD FOR A NUCLEAR REACTOR AND METHOD OF PREPARATION

Henry H. Hausner, New York, N. Y., assignor, by mesne assignments, to the United States of America as represented by the United States Atomic Energy Commission No Drawing. Application December 8, 1952
Serial No. 324,835

6 Claims. (Cl. 204—193.2)

This invention relates to an improved control rod for a nuclear reactor and for the method of its preparation.

A number of types of control rods have been developed for nuclear reactors. These control rods are normally made of materials which have the ability to absorb thermal neutrons. These rods for the most part work on the principle of absorbing all the neutrons in one part of the reactor while permitting the remainder of the reactor to operate without interference. Although the reactor can be controlled in this manner it is not the most desirable method since it does not permit the entire reactor to function at an overall reduced rate.

It is an object of this invention to provide a control rod which can be used to control the rate of reaction of the reactor throughout its entire length.

It is a further object of this invention to provide a method for making control rods of any desired degree of neutron absorption.

It has been found that these and other advantages incidental thereto can be attained by making the control rods from a mixture of powder of a rare earth metal oxide or rare earth metal carbide and a powder of a ductile metal which is adapted for use by hot pressing techniques and which has a low cross sectional area of absorption.

Although the rare earth metal itself might well be used in place of the oxide or carbide in view of the fact that it has the ability to strongly absorb thermal neutrons the oxide and/or carbide have been chosen in view of the fact that they are usually much cheaper than the rare earth metals and can be much more easily obtained and have the necessary characteristics which make it possible to make a control rod having the desired characteristics. Of the two materials, the oxide and the carbide, the oxide is normally to be preferred in view of the fact that its particle size is somewhat smaller than that of the carbide. The oxide can, therefore, as a general rule be more homogeneously distributed in the matrix material. Both materials can, of course, be uniformly distributed if one considers uniform distribution to mean that each cubic area of the matrix material can be made to contain a similar weight amount of either rare earth metal compound throughout the entire mass of the matrix. However, since the particle size of the oxide is smaller it is possible to spread the oxide a bit farther than the carbide while using the same number of particles.

The general requirements of the metal to be used as a matrix is that the metal be ductile and suitable for hot pressing and usually that it have a relatively low cross sectional area of absorption. Typical metals which may be used for this purpose are nickel, cobalt, beryllium, zirconium, titanium, aluminum and copper. It should, of course, be understood that these examples are merely illustrative and that other metals might also be used.

The amount of oxide or carbide which is to be incorporated in the metal matrix may vary over rather wide limits, in fact, all the way from very small amounts of the rare earth metal oxide or carbide to very large amounts wherein the amount of matrix material is merely sufficient to act as a binder for the oxide or carbide. The actual amounts of rare earth metal oxide or carbide in the control rod formed in this manner quite naturally control the degree of retarding action that the rod will have on the reactor in which it is used. That is to say, a rod having 10% of gadolinium oxide for example when used in a reactor will have a greater retarding action than will a rod containing 5% of gadolinium oxide and similarly a rod containing more than 10% of gadolinium oxide will have a greater retarding action. It is, therefore, readily apparent that one may by controlling the percentage of gadolinium oxide distributed in the metal matrix produce a rod which will control the reaction in the reactor to a desired degree and since the control rod made in this manner does not stop the reaction completely in any one zone of the reactor in which it is used it can readily be seen that one can either retard or speed up the reaction of the reactor by replacing a control rod used therein with one which contains a different proportionate amount of the gadolinium oxide or carbide uniformly distributed in the metal matrix.

These rods can readily be made by mixing together a powdered oxide or carbide of gadolinium with the powdered particles of the matrix metal and then subsequently pressing and sintering the mixture. The temperature and pressure conditions used to form the rods are, of course, dependent to a large extent on the matrix materials used. The exact conditions are, of course, well within the knowledge of those skilled in the art. The following examples are illustrative of the manner in which these control rods can be made. 10% of gadolinium oxide which is extremely fine is mixed with 200 mesh beryllium powder. After these powders have been thoroughly mixed they are pressed at 25 t. s. i. and held at a temperature of 645° C. for approximately fifteen minutes while maintaining vacuum conditions in the pressing area. The theoretical density for the material is 2. A product having the density of 1.98 can readily be obtained in this manner.

A rod can readily be made from gadolinium carbide in a similar manner. When one takes —100 mesh gadolinium carbide and mixes it with —200 mesh beryllium powder. When these materials are pressed at 25 t. s. i. and held at 645° C. for approximately 15 minutes a rod having a density of about 1.97 can readily be obtained. If the powders are properly mixed the rods will exhibit a homogeneous and uniform distribution of the gadolinium compound in the metal matrix. These rods can as has been indicated above be made with metal matrixes other than beryllium.

The gadolinium compounds are preferable to the use of gadolinium in metal form in view of the fact that the metal is difficult to prepare. It may be prepared by the electrolysis of fused salts or from non-aqueous solutions or by the reduction of chloride with calcium, magnesium, etc. However, this element is generally made available in oxide form so that reduction would involve additional steps. Use of powder metallurgical techniques is preferable to melting the composition since melting requires higher temperatures.

While the above description submitted herewith discloses a preferred and practical embodiment of the control rod of this invention it will be understood by the specific details of construction and arrangement of parts described are by way of illustration and are not to be construed as limiting the scope of the invention.

What is claimed is:

1. In a nuclear reactor a control rod which comprises a compound selected from the group of gadolinium oxide and gadolinium carbide distributed in a metal matrix having a low cross sectional area of absorption for thermal neutrons, the metal of said matrix being selected from the group consisting of aluminum, beryllium and zirconium.

2. The article of claim 1 in which the matrix metal is aluminum.

3. The article of claim 1 in which the matrix metal is beryllium.

4. The article of claim 1 in which the matrix metal is zirconium.

5. In a nuclear reactor, a control rod which comprises finely divided gadolinium oxide uniformly distributed in a metal matrix having a low cross sectional area of absorption for thermal neutrons, the metal of said matrix being selected from the group consisting of aluminum, beryllium and zirconium.

6. In a nuclear reactor, a control rod which comprises finely divided gadolinium carbide uniformly distributed in a metal matrix having a low cross sectional area of absorption, the metal of said matrix being selected from the group consisting of aluminum, beryllium and zirconium.

References Cited in the file of this patent

UNITED STATES PATENTS

| | | |
|---|---|---|
| 1,109,887 | Auer | Sept. 8, 1914 |
| 2,545,438 | Stumbock et al. | Mar. 20, 1951 |

OTHER REFERENCES

"Nucleonics," vol. 11, No. 6, publ. June 1953 by McGraw-Hill Book Co., Inc., New York, N. Y. (Table 2), page 20.